(12) United States Patent
Wu et al.

(10) Patent No.: US 9,325,952 B2
(45) Date of Patent: Apr. 26, 2016

(54) METHOD OF MULTI-SCREEN PAGINATION PLAYING

(71) Applicant: HANGZHOU HIKVISION DIGITAL TECHNOLOGY CO., LTD., Hangzhou (CN)

(72) Inventors: Yang Wu, Hangzhou (CN); Yanming Shi, Hangzhou (CN); Zhiping Shi, Hangzhou (CN); Xiaoyuan Zhang, Hangzhou (CN)

(*) Notice: Subject to any disclaimer, the term of this patent is extended or adjusted under 35 U.S.C. 154(b) by 0 days.

(21) Appl. No.: 14/758,790

(22) PCT Filed: Jan. 7, 2014

(86) PCT No.: PCT/CN2014/070207
§ 371 (c)(1),
(2) Date: Jun. 30, 2015

(87) PCT Pub. No.: WO2014/108054
PCT Pub. Date: Jul. 17, 2014

(65) Prior Publication Data
US 2015/0341598 A1 Nov. 26, 2015

(30) Foreign Application Priority Data
Jan. 10, 2013 (CN) .......................... 2013 1 0009344

(51) Int. Cl.
*H04N 5/445* (2011.01)
*H04N 7/18* (2006.01)
*H04N 5/268* (2006.01)
*H04N 5/45* (2011.01)

(52) U.S. Cl.
CPC .............. *H04N 7/181* (2013.01); *H04N 5/268* (2013.01); *H04N 5/44591* (2013.01); *H04N 5/45* (2013.01); *H04N 2005/44595* (2013.01)

(58) Field of Classification Search
USPC ......... 348/564, 563, 565, 567, 569, 586, 598, 348/705, 706, 714, 719, 725, 432.1, 385.1, 348/333.02, 38; 725/37, 38, 40; 345/204, 345/634
See application file for complete search history.

(56) References Cited

U.S. PATENT DOCUMENTS 6,177,931 B1 * 1/2001 Alexander ......... G06Q 30/0269
 348/565
6,239,794 B1 * 5/2001 Yuen .................. H04N 5/44543
 348/565

(Continued)

FOREIGN PATENT DOCUMENTS

CN 1901642 A 1/2007
CN 101296306 A 10/2008

(Continued)

OTHER PUBLICATIONS

Search Report in International Application No. PCT/CN2014/070207 dated Mar. 27, 2014.

*Primary Examiner* — Jefferey Harold
*Assistant Examiner* — Mustafizur Rahman
(74) *Attorney, Agent, or Firm* — Marshall, Gerstein & Borun LLP

(57) ABSTRACT

The present disclosure provides a method and terminal of multi-screen pagination playing. The method includes the follows. A video channel list may be established. At least one video channel may be selected from the video channel list. A pagination number of a display screen may be determined, based on number of selected video channel and split-screen number of the display screen. The selected video channels may be played on each split-screen of a respective pagination, based on sequence of the selected video channels. In the present disclosure, a one-to-one correspondence may be configured in sequence for video channels of different devices and playing pictures of each pagination, each split-screen.

8 Claims, 5 Drawing Sheets

(56) References Cited

U.S. PATENT DOCUMENTS

| | | | | |
|---|---|---|---|---|
| 6,246,442 | B1* | 6/2001 | Harada | G06F 17/211 |
| | | | | 348/563 |
| 6,314,570 | B1* | 11/2001 | Tanigawa | G06F 3/0481 |
| | | | | 348/E5.104 |
| 6,331,877 | B1* | 12/2001 | Bennington | A63F 13/12 |
| | | | | 348/564 |
| 6,732,371 | B1* | 5/2004 | Lee | H04N 5/44543 |
| | | | | 348/563 |
| 8,125,573 | B2* | 2/2012 | Ohta | H04N 5/44591 |
| | | | | 340/2.4 |
| 8,542,321 | B2 | 9/2013 | Fu et al. | |
| 8,717,339 | B2* | 5/2014 | Satake | H04N 5/44591 |
| | | | | 345/204 |
| 2005/0114885 | A1* | 5/2005 | Shikata | H04H 40/18 |
| | | | | 725/38 |
| 2011/0122235 | A1* | 5/2011 | Lee | H04N 13/0452 |
| | | | | 348/51 |
| 2011/0193879 | A1* | 8/2011 | Kim | H04N 5/445 |
| | | | | 345/634 |

FOREIGN PATENT DOCUMENTS

| | | |
|---|---|---|
| CN | 101388982 A | 3/2009 |
| WO | WO-2010/145052 A1 | 12/2010 |

* cited by examiner

METHOD OF MULTI-SCREEN PAGINATION PLAYING

RELATED-APPLICATION

The application claims the benefit of Chinese Patent Application No. 201310009344.4, filed with the State Intellectual Property Office of the P.R.C. on Jan. 10, 2013 and entitled "method of multi-screen pagination playing", the entire disclosures of which are hereby incorporated by reference.

TECHNICAL FIELD

The application relates to video monitoring technologies, and more particularly, to a method for pagination playing multiple monitoring screens in video monitoring.

BACKGROUND

At present, both of general video monitoring software and a plug-in directly accessing a monitoring device through a browser may provide a function. That is, a function to simultaneously play multiple video channels on multiple display screens (including preview or playback). Multi-screen playing is generally achieved through a split-screen mode. That is, a split-screen display is implemented on a display screen, such that the display screen may be divided into multi-screen to be played. For example, one split screen (a single screen), that is, one screen is displayed on a display screen. Four split screens (2×2), that is, divide one display screen into four screen areas, such as four screen areas of upper left, upper right, lower left, lower right, on a display screen. One screen is respectively displayed on each screen area. A display screen may display four screens in all. Nine split screens (3×3) refer to dividing a display screen into nine screen areas. For example, a display screen is divided into nine screen areas in the form of scratchable latex. One screen is respectively displayed on each screen area. A display screen may display nine screens in all.

When the maximum split-screen number supported by software is four (four split screens), while a user expects to conveniently preview playing screens of 16 video channels, the user's demands may not be satisfied only relying on split-screen mode. Thus, some software provides a pagination mode, in other words, paging mode. Based on number of 16 video channels, four split screens may be configured for a display screen. A display of four pages may also be adopted. Each page may display screens of four video channels. Four screen areas, upper left, upper right, lower left, lower right of a display screen on each page may respectively display screen of one video channel. That is, screens of the first, second, third, fourth video channels may be displayed on the first page. Screens of the fifth, sixth, seventh and eighth video channels may be displayed on the second page. Screens of the ninth, tenth, eleventh, and twelfth video channels may be displayed on the third page. Screens of the thirteenth, fourteenth, fifteenth and sixteenth video channels may be display on the fourth page. The user may conveniently preview video screen of each video channel by turning pages. Page turning may be implemented, by providing a button or a sliding gesture.

Accompanying with improvement of usage requirements, the following inconveniences still exist in the existing method. For example, (1) play contents of all the video channels in one device in sequence, while contents of several video channels in one device may not be selectively played;

(2) all of the video channels played should belong to a same device, while contents of multiple video channels respectively belonging to different devices may not be played;

(3) split-screen mode may not be switched during the process of pagination playing, or, pages may not be turned after switching the split-screen mode;

(4) playing of a certain video channel may not be closed during playing process.

Thus, multi-screen pagination playing may be further improved.

SUMMARY

In view of above, the present disclosure provides a method of multi-screen pagination playing, so as to flexibly operate screens of multiple video channels.

The technical solutions of the present disclosure may be implemented as follows.

A method of multi-screen pagination playing, including:
establishing a video channel list;
selecting at least one video channel from the video channel list;
determining a pagination number of a display screen, based on number of video channels selected and split-screen number of the display screen;
playing the video channels selected on each split-screen of a respective pagination in turn, based on sequence of the selected video channels in the video channel list;
wherein determining the pagination number of the display screen, based on the number of video channels selected and the split-screen number of the display screen, is implemented by using the following formula: $p = n/s + (n \% s > 0)$,
n is the number of video channels, s is the split-screen number, p is the pagination number, $(n \% s > 0)$ denotes that, when a remainder obtained after dividing n with s is greater than 0, $(n \% s > 0) = 1$; otherwise, $(n \% s > 0) = 0_o$ Furthermore, when the split-screen number is 1, and the number of the selected video channels is 1, the pagination number is 1;
when the split-screen number is 4, and the number of the selected video channels is between 5 and 8, the pagination number is 2;
when the split-screen number is 4, and the number of the selected video channels is between 9 and 12, the pagination number is 3.

Furthermore, under the circumstances that the selected video channels are played when the split-screen number is greater than 1, when selecting any video channel from the played video channels, switching the split-screen number to 1, re-determining the pagination number of the display screen, based on the number of the selected video channels and the switched split-screen number, and switching the display screen to a new pagination located by the any video channel, and playing the any video channel selected.

Furthermore, under the circumstances that a video channel is closed, when the split-screen picture of the closed video channel is on the last split-screen of the last pagination, and there is a split-screen picture of another video channel being played on the last pagination after closing the video channel, not executing other operations in addition to closing the video channel.

Furthermore, under the circumstances that the video channel is closed, when the split-screen picture of the closed video channel is on the last split-screen of the last pagination, and there is no split-screen picture of another video channel being played on the last pagination, deleting the last pagination, and playing video contents on a previous pagination of the last pagination deleted.

Furthermore, under the circumstances that a video channel is closed, when the split-screen picture of the closed video channel is not on the last split-screen of the last pagination, moving each video channel after the closed video channel in the video channel list forward to a previous split-screen to be played.

Furthermore, after moving the video channel forward to the previous split-screen in sequence, and playing the moved video channel, when there is no split-screen picture being played on the last pagination, deleting the last pagination.

A terminal, which includes a memory, and a processor in communication with the memory, wherein the memory stores instructions executable by the processor, and the instructions are stored in a module for establishing video channel list, a video channel selecting module, a pagination module, and a playing module, wherein

- the module for establishing video channel list is to establish a video channel list;
- the video channel selecting module is to select at least one video channel from the video channel list;
- the pagination module is to determine a pagination number of a display screen, based on number of video channel selected and split-screen number of the display screen; and
- the playing module is to play the selected video channels on each split-screen of a respective pagination in sequence, based on sequence of the selected video channels in the video channel list;
- wherein determining the pagination number of the display screen based on the number of the selected video channels and the split-screen number of the display screen is implemented by using the following formula, $p = n/s + (n \% s > 0)$, n is the number of the video channels, s is the split-screen number, p is the pagination number, (n % s>0) denotes that, when a remainder obtained after dividing n by s is greater than 0, (n % s>0)=1; otherwise, (n % s>0)=0.

Based on the foregoing technical solutions, it can be seen that, compared with the prior art, by adopting the method of multi-screen pagination playing provided by the present disclosure, a one-to-one correspondence may be configured for a played video channel and played screens of each pagination, each split-screen in sequence, so as to implement pagination playing of multiple video channels of different devices. Subsequently, centralized playing of video channels of multiple devices may be achieved. Besides, by using the method of the present disclosure, split-screen mode may be switched during the process of pagination playing. After switching the split-screen mode, pagination playing and page turning operations may be executed based on a new split-screen mode, which may comply with users' habits. In addition, during the process of pagination playing by using the method of the present disclosure, playing of any video channel may be closed. After closing the playing of any video channel, a one-to-one correspondence may still exist between open video channels and split-screen pictures in sequence. Compared with the prior art, convenience for controlling pagination playing of multiple screens may be greatly improved in the present disclosure.

BRIEF DESCRIPTIONS OF THE DRAWINGS

The following attached figures illustrate some examples to describe technical solutions of the present disclosure. The present disclosure is not limited to the features shown in the following figures. In the following figures, similar symbols may denote similar elements.

DETAILED DESCRIPTIONS

To enable objectives, technical solutions and advantages of the present disclosure more clear, detailed descriptions of the present disclosure are further provided in the following, accompanying with attached figures and examples.

Figure 1:
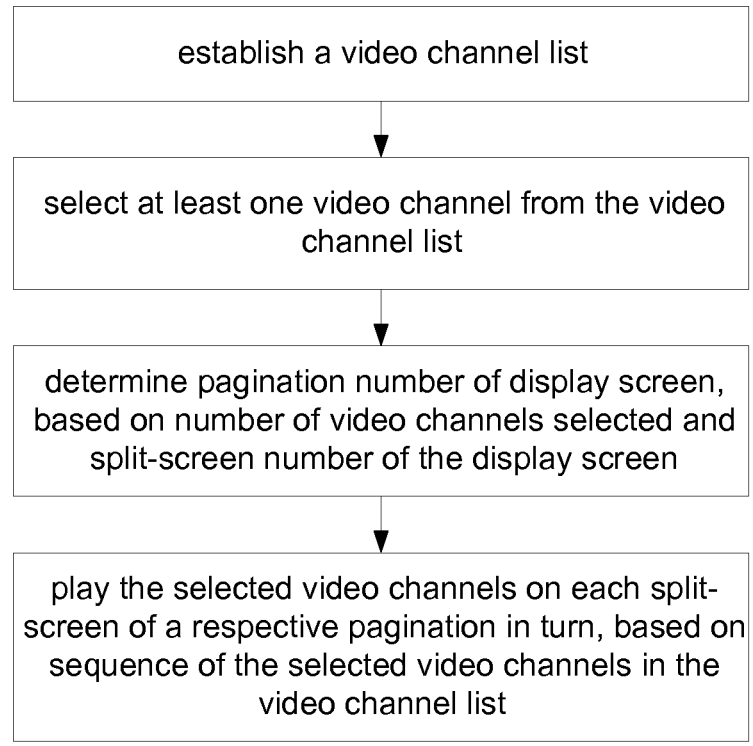
FIG. 1 is a flowchart illustrating a method of multi-screen pagination playing, in accordance with an example of the present disclosure.

As shown in FIG. 1, the method of multi-screen pagination playing provided by the present disclosure mainly includes the follows:

- establish a video channel list;
- select at least one video channel from the video channel list;
- determine pagination number of a display screen, based on number of video channels selected and split-screen number of the display screen;
- play the selected video channels on each split-screen of a respective pagination in turn, based on sequence of the selected video channels in the video channel list.

Detailed descriptions about the method in the present disclosure will be provided in the following, accompanying with attached figures.

Figure 2:
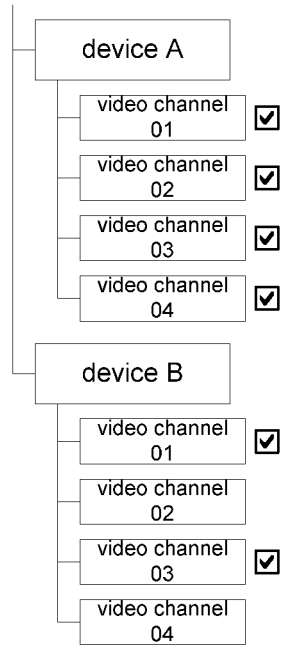
FIG. 2 is a diagram illustrating an established video channel list and how to select a video channel, in accordance with an example of the present disclosure.

There are two devices in the example illustrated with FIG. 2, which are respectively device A and device B. Device A may include four video channels, which are respectively video channels 01, 02, 03 and 04. Similarly, device B may also include four video channels, which are respectively video channels 01, 02, 03 and 04. In the example, a video channel list may be established by respectively taking device and video channel as a first-level node and a second-level node. Specifically, devices A and B may be taken as the first-level node, and video channels of devices A and B may be taken as the second-level node, so as to establish the video channel list.

As shown in FIG. 2, at least one video channel may be selected from the video channel list in the form of check box, so as to play video. For example, as shown in FIG. 2, video channels 01, 02, 03 and 04 of device A, and video channels 01 and 03 of device B are selected. That is, the video playing is executed for the foregoing six video channels.

It should be noted that, establishment of the video channel list may be not limited to the foregoing modes. In general, in the present disclosure, the channel list may be established based on device, and/or, video channel of the device. Different modes may be employed, based on different specific conditions. For example, the video channel list may be established by taking device as a node. At this time, when selecting a certain device, all of the video channels of the certain device may be selected. For instance, take devices A and B in FIG. 2 as node, instead of taking each video channel of devices A and B as node, when selecting device A or B, all of the video channels of device A or B may be selected. For example, take other devices and video channels of a certain device or some devices as node, while video channels of the foregoing other devices are not taken as node, establish the video channel list. At this time, when selecting a certain device or some devices, all of the video channels of the certain device or some devices may be selected. For example, take device B and video channels 01, 02, 03, 04 of device A in FIG. 2 as node, at this time, a video channel or multiple video channels of device A may be independently and respectively selected. When selecting device B, all of the video channels of device B may be selected. Each video channel of device B may not be independently and respectively selected.

The device in the present disclosure refers to a video collecting device, or a video storing device including at least one video channel. The video collecting device may be a camera, and so on. The video storing device may be a digital video recorder (DVR), and so on.

In the present disclosure, by using the established video channel list, a unified management may be performed to various devices and multiple video channels of the various devices. Subsequent multi-screen pagination playing may be performed to devices and video channels selected from the video channel list, instead of independently operating each device without using the video channel list. The video channel list established in the present disclosure may be taken as a virtual device or apparatus, which may perform a unified management to all of the devices and video channels. Thus, it may be considered to play video channels provided by the virtual device or apparatus, so as to achieve a unified playing operation for video provided by each entity device (a video collecting device, and/or, video storing device including at least one video channel)

Subsequently, determine pagination number of a display screen, based on number of selected video channels and split-screen number of the display screen.

First of all, switch to the most appropriate split-screen mode S based on number n (e.g., n=6 in FIG. 2) of video channels selected from the video channel list. For example, when the maximum split-screen number Smax supported is 4, that is, under the circumstances of 4 split-screen, when number n of video channel selected from the video channel list is 1, switch to one split-screen mode (s=1). When number n of video channels selected from the video channel list is greater than 1, switch to 4 split-screen mode (s=4).

And then, calculate pagination number p, based on split-screen mode s and number n of video channels selected from the video channel list with the following formula, p=n/s+(n % s>0).

In the foregoing formula, n may denote number of video channels, s may denote split-screen number, and p may denote pagination number. (n % s>0) may reflect the following meanings. When a remainder obtained after dividing n by s is greater than 0, (n % s>0)=1, at this time p=n/s+1; otherwise, (n % s>0)=0, at this time p=n/s.

For example, when the split-screen number is 1, and number of selected video channel is 1, the pagination number is 1. When the split-screen number is 4, and number of selected video channels is between 5 and 8, the pagination number is 2. When the split-screen number is 4, and the number of selected video channels is between 9 and 12, the pagination number is 3, and so on.

And then, based on sequence of the selected video channels in the video channel list, play the selected video channels on each split-screen of a respective pagination in turn.

Figure 3A:
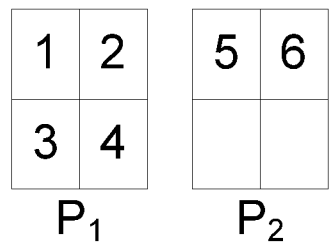
FIG. 3A is a diagram illustrating playing of six video channels and a four split-screen video channel.

For example, when the number of video channels selected from the video channel list in FIG. 2 is 6, and the split-screen number is 4 (that is, 4 split-screen), playing position of each video channel is shown in FIG. 3A. When the split-screen number is 1 (1 split screen), playing position of each video channel is shown in FIG. 3B.

In FIG. 3A, determine that the pagination number of display screen is 2 pages, based on channel number 6 and split-screen number 4, which are respectively pagination P1 and pagination P2. Play each video channel on a respective split-screen of P1 and P2, based on sequence of the video channels in the video channel list. That is, as shown in FIG. 2, play video channel 01 of device A on split-screen 1 (upper left) of P1. Play video channel 02 of device A on split-screen 2 (upper right) of P1. Play video channel 03 of device A on split-screen 3 (lower left) of P1. Play video channel 04 of device A on split-screen 4 (lower right) of P1. Play video channel 01 of device B on split-screen 1 (upper left) of P2. Play video channel 03 of device B on split-screen 2 (upper right) of P2.

Figure 3B:
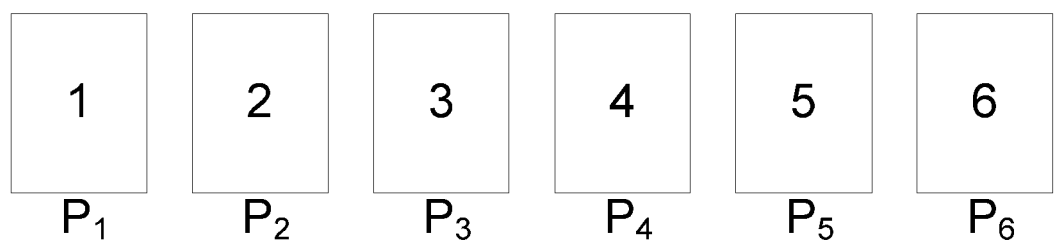
FIG. 3B is a diagram illustrating playing of six video channels and one split-screen video channel.

In FIG. 3B, based on channel number 6 and split-screen number 1, determine that pagination of display screen is 6 pages, which may be respectively pagination P1, P2, P3, P4, P5 and P6. Play each video channel on P1 to P6, based on sequence of the video channels in the video channel list. That is, as shown in FIG. 2, play video channel 01 of device A on P1. Play video channel 02 of device A on P2. Play video channel 03 of device A on P3. Play video channel 04 of device A on P4. Play video channel 01 of device B on P5. Play video channel 03 of device B on P6.

Figure 4A:
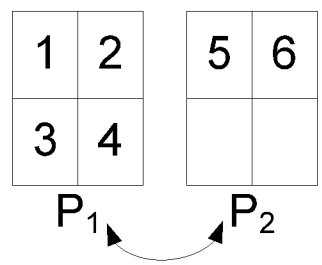
FIG. 4A is a diagram illustrating page turning operations of six video channels and four split screens.
Figure 4B:
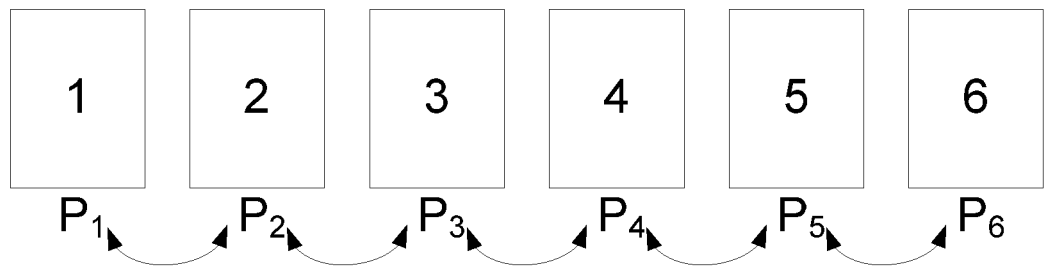
FIG. 4B is a diagram illustrating page turning operations of six video channels and one split screen.

After calculating a correspondence among split-screen mode, pagination number, video channels selected from the video channel list and split-screen picture, start playing. First of all, pagination P1 may be displayed. A user may switch to P2, P3 in turn, and so on, with page turning operations (for example, turn pages with a button or sliding gesture), so as to preview multi-screen playing. FIG. 4A illustrates page turning operations of 6 video channels and 4 split screens. FIG. 4B illustrates page turning operations of 6 video channels and 1 split screen.

In the present disclosure, the split-screen mode may be switched during the playing process. Pagination playing may be executed based on a new split-screen mode after switching. For example, under the circumstances that the split-screen number is greater than 1, during the process of playing the selected video channel, the split-screen number may be switched to 1 when selecting any video channel from the played video channels, and re-determine pagination number of the display screen, based on number of selected video channels and switched split-screen number. Switch the display screen to a new pagination located by the any video channel selected, so as to play the any video channel selected. An example will be given in the following, in which the split-screen number is switched to 1 from 4. For other cases when the split-screen number is greater than 1, the split-screen number may be switched to 1 similarly based on the following descriptions, which are not repeated here.

Figure 5:
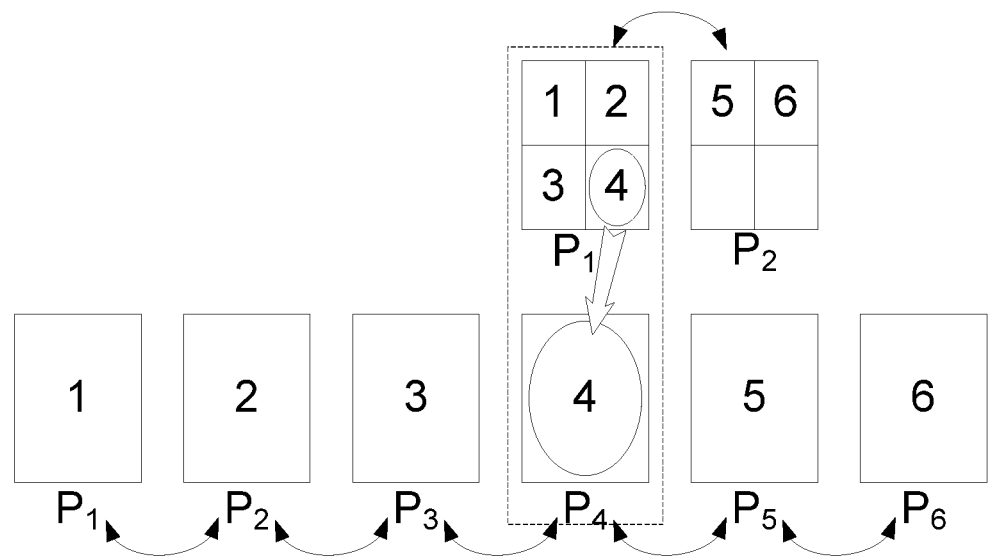
FIG. 5 is a diagram illustrating operations to switch a split-screen mode.

As shown in FIG. 5, number of video channels in the video channel list is 6, the maximum split-screen number is 4, pagination P1 is played with 4 split-screen mode, the split-screen 4 (a screen of the fourth video channel in the video channel list being played) may be touched with double-click or expanding gesture, so as to switch to 1 split screen mode. Re-determine that pagination number of the display screen is 6 based on switched split-screen number 1, and then switch to the fourth page of the 1 split-screen mode to play (corresponding to split-screen 4 of P1 in the 4 split-screen mode). And then, a user may turn pages from the new pagination in the split-screen mode. The dashed box in FIG. 5 may identify the pagination being played.

During the pagination playing process of the present disclosure, playing of a video channel corresponding to a certain split-screen picture may be closed. After closing the playing of the foregoing video channel, a one-to-one correspondence may still exist between the video channel list and the split-screen picture in sequence. There may be two cases in the closing process as follows.

(1) During the process of closing a certain video channel, when the split-screen picture of the closed video channel is on the last split-screen of the last pagination, and after closing the video channel, there is still a split-screen picture of another video channel being played on the last pagination, other operations in addition to closing the video channel may not be executed.

Figure 6A:
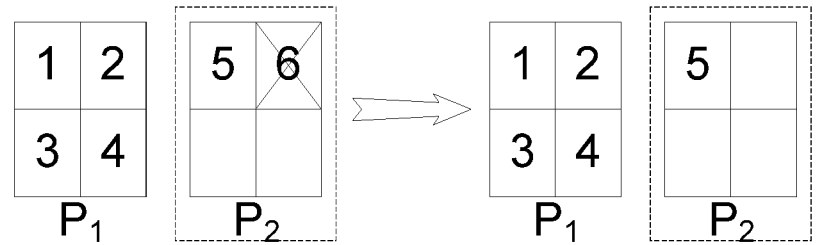
FIG. 6A is a diagram illustrating operations to close the last video channel, in accordance with an example of the present disclosure.

For example, as shown in FIG. 6A, when the split-screen picture of the closed video channel is on the last split-screen of the last pagination, it may be guaranteed that a one-to-one correspondence still exists between open video channels in the video channel list and split-screen picture at this time, without executing any operations. Number of video channels in the video channel list in FIG. 6A is 6, 4 split-screen mode is employed, and pagination P2 is played. At this time, when video channels played on split-screen 6 are closed, any operation in addition to closing the video channel is not needed. The dashed box in FIG. 6A may identify the pagination being played.

During the process of closing any video channel, when the split-screen picture of the closed video channel is on the last split-screen of the last pagination, suppose there is no split-screen picture of another video channel being played on the last pagination after closing the video channel, delete the last pagination. And play video contents on a previous pagination of the last pagination deleted.

Figure 6B:
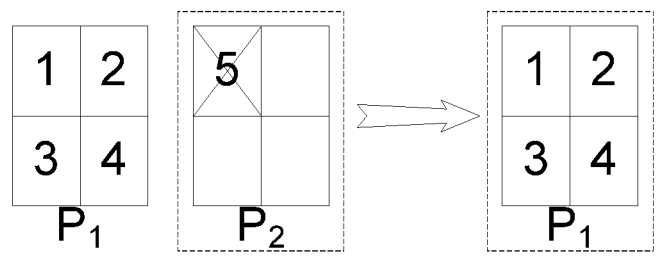
FIG. 6B is a diagram illustrating operations to close the last video channel, in accordance with another example of the present disclosure.

For example, as shown in FIG. 6B, number of video channels in the video channel list is 5, 4 split-screen mode is adopted, and pagination P2 is played. At this time, when video channel played on split-screen 5 is closed, there is no played screen on pagination P2. Thus, pagination P2 may be deleted. And pagination P1 may be played. The dashed box in FIG. 6B may identify the pagination being played.

(2) When closing a certain video channel, suppose the split-screen picture of the closed video channel is not on the last split-screen of the last pagination, move each video channel after the closed video channel in the video channel list forward in sequence to a previous split-screen to be played.

Figure 7A:
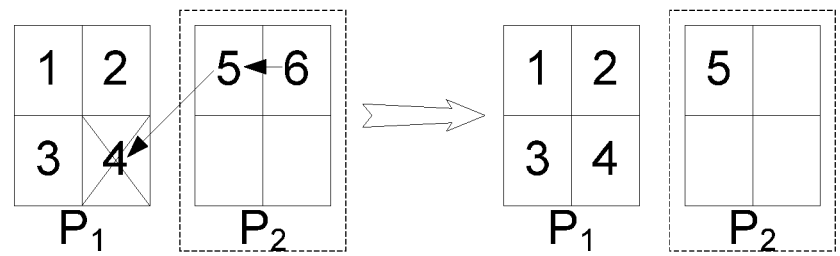
FIG. 7A is a diagram illustrating operations to close a video channel which is not the last one, in accordance with an example of the present disclosure.

For example, as shown in FIG. 7A, number of video channels in the video channel list is 6, 4 split-screen mode is adopted, and pagination P1 is displayed. At this time, when split-screen 4 therein is closed, video channel of original split-screen picture 5 may be moved forward to split-screen picture 4 to be played. Video channel of original split-screen picture 6 may be moved forward to split-screen picture 5 to be played. The dashed box in FIG. 7A may identify the pagination being played.

Figure 7B:
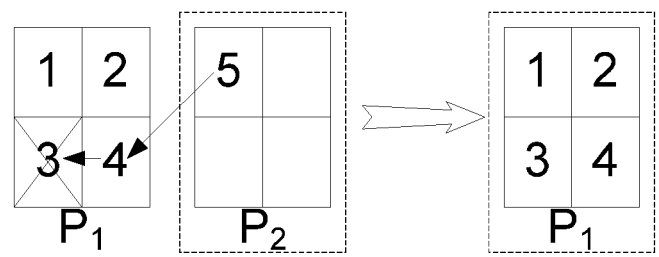
FIG. 7B is a diagram illustrating operations to close a video channel which is not the last one, in accordance with another example of the present disclosure.

In the video list, when each video channel is moved forward in sequence to the previous split-screen and is played, suppose there is no split-screen picture being played on the last pagination, delete the last pagination. After deleting the last pagination, play the previous pagination of the last pagination deleted. For example, as shown in FIG. 7B, number of video channels in the video channel list is 5, 4 split-screen mode is adopted, and pagination P1 is played. At this time, when closing split-screen picture 3, video channel of the original split-screen picture 4 may be moved forward to split-screen picture 3 to be played. Video channel of the original split-screen picture 5 may be moved forward to split-screen picture 4 to be played. At this time, there is no screen being played on pagination P2. Thus, pagination P2 may be deleted. And then, pagination P1 may be played. The dashed box in FIG. 7B may identify the pagination being played.

Figure 8:
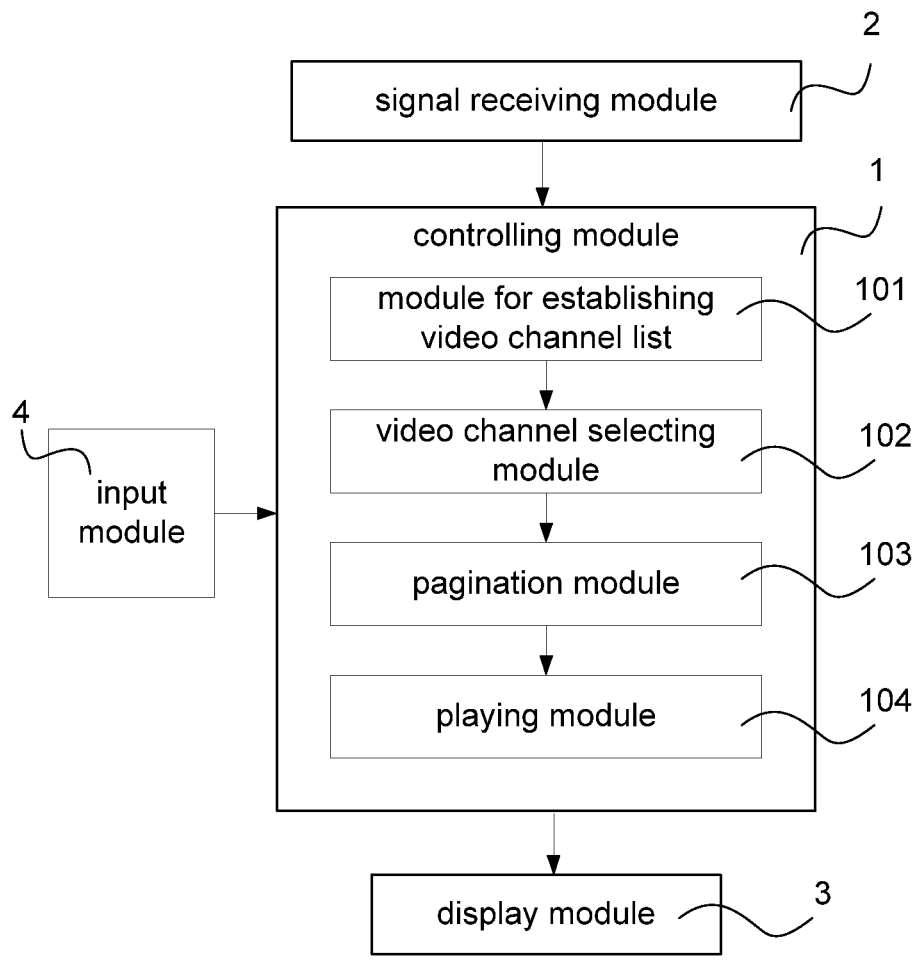
FIG. 8 is a schematic diagram illustrating structure of a terminal, in accordance with an example of the present disclosure.

Based on the foregoing method of multi-screen pagination playing, the present disclosure provides a terminal. As an example, the terminal may be a mobile phone. As shown in FIG. 8, the terminal may include a module for establishing video channel list, which is to establish a video channel list; a video channel selecting module, which is to select at least one video channel from the video channel list; a pagination module, which is to determine pagination number of display screen, based on number of video channels selected and split-screen number of the display screen; and a playing module, which is to play the selected video channels on each split-screen of a respective pagination in sequence, based on sequence of the selected video channels in the video channel list.

The following formula may be used, when determining the pagination number of the display screen, based on number of selected video channels and split-screen number of the display screen, p=n/s+(n % s>0).

In the foregoing formula, n may denote number of video channels, s may denote split-screen number, p may denote pagination number. (n % s>0) may denote the following meanings. When a remainder obtained after dividing n by s is greater than 0, (n % s>0)=1; otherwise, (n % s>0)=0

As shown in FIG. 8, the terminal may include a signal receiving module 2, which is to receive a video signal from at least one device, and transmit the video signal to controlling module 1; a display module 3, which is to play contents of video channel processed by controlling module 1; and an input module 4, which is to select a video channel. Each device may include at least one video channel.

In the present disclosure, the module for establishing video channel list, the video channel selecting module, the pagination module and the playing module are set within controlling module 1, thereby implementing multi-screen pagination playing of a terminal (such as mobile phone).

For example, still another structure of a terminal provided by the present disclosure may include a memory, and a processor in communication with the memory. The memory may store instructions executable by the processor, and the instructions are stored in a controlling module, a signal receiving module, a display module and an input module. Specifically, the instructions stored in the controlling module are further distributed in a module for establishing video channel list, a video channel selecting module, a pagination module, and a playing module. When the foregoing instructions are executed, functions of the controlling module, the signal receiving module, the display module and the input module are respectively the same as that of the controlling module 1, the signal receiving module 2, the display module 3 and the input module 4 as shown in FIG. 8. Similarly, when the foregoing instructions are executed, functions of the module for establishing video channel list, the video channel selecting module, the pagination module and the playing module are respectively the same as that of the module for establishing video channel list 101, the video channel selecting module 102, the pagination module 103 and the playing module 104 as shown in FIG. 8.

Compared with the prior art, in the multi-screen pagination playing method provided by the present disclosure, a one-to-one correspondence may be configured in sequence for played video channels and played pictures of each pagination and each split-screen, so as to implement pagination playing of multiple video channels of different devices. Subsequently, centralized playing of video channels of multiple devices may be achieved. By using the method provided by the present disclosure, split-screen mode may be switched during the process of pagination playing. After switching the split-screen mode, pagination playing and page turning operations may be executed based on a new split-screen mode, which may comply with users' habits. In addition, during the process of pagination playing by using the method provided by the present disclosure, playing of any video channel may be closed. After closing the playing of the any video channel, a one-to-one correspondence may still exist in sequence between open video channels and split-screen pictures. Compared with the prior art, convenience for controlling multi-screen pagination playing may be greatly improved by using the technical solutions provided by the present disclosure.

The foregoing is only preferred examples of the present disclosure, which is not for use in limiting the present disclosure. Any modifications, equivalent substitutions and improvements made within the spirit and principle of the present disclosure, should be covered by the protection scope of the present disclosure.

What is claimed is:

1. A method of multi-screen pagination playing, comprising:
    establishing a video channel list;
    selecting at least one video channel from the video channel list;
    determining a pagination number of a display screen, based on number of video channels selected and split-screen number of the display screen;
    playing the video channels selected on each split-screen of a respective pagination in turn, based on sequence of the selected video channels in the video channel list;
    wherein determining the pagination number of the display screen, based on the number of video channels selected and the split-screen number of the display screen, is implemented by using the following formula: $p=n/s+(n \% s>0)$,
    n is the number of video channels, s is the split-screen number, p is the pagination number, $(n \% s>0)$ denotes that, when a remainder obtained after dividing n with s is greater than 0, $(n \% s>0)=1$; otherwise, $(n \% s>0)=0$.

2. The method according to claim 1, wherein when the split-screen number is 1, and the number of the selected video channels is 1, the pagination number is 1;
    when the split-screen number is 4, and the number of the selected video channels is between 5 and 8, the pagination number is 2;
    when the split-screen number is 4, and the number of the selected video channels is between 9 and 12, the pagination number is 3.

3. The method according to claim 1, further comprising:
    under the circumstances that the selected video channels are played when the split-screen number is greater than 1, when selecting any video channel from the played video channels, switching the split-screen number to 1, re-determining the pagination number of the display screen, based on the number of the selected video channels and the switched split-screen number, and switching the display screen to a new pagination located by the any video channel, and playing the any video channel selected.

4. The method according to claim 1, further comprising:
    under the circumstances that a video channel is closed, when the split-screen picture of the closed video channel is on the last split-screen of the last pagination, and there is a split-screen picture of another video channel being played on the last pagination after closing the video channel, not executing other operations in addition to closing the video channel.

5. The method according to claim 4, further comprising:
    under the circumstances that the video channel is closed, when the split-screen picture of the closed video channel is on the last split-screen of the last pagination, and there is no split-screen picture of another video channel being played on the last pagination, deleting the last pagination, and playing video contents on a previous pagination of the last pagination deleted.

6. The method according to claim 1, further comprising:
    under the circumstances that a video channel is closed, when the split-screen picture of the closed video channel is not on the last split-screen of the last pagination, moving each video channel after the closed video channel in the video channel list forward to a previous split-screen to be played.

7. The method according to claim 6, further comprising:
    after moving the video channel forward to the previous split-screen in sequence, and playing the moved video channel, when there is no split-screen picture being played on the last pagination, deleting the last pagination.

8. A terminal, which comprises a memory, and a processor in communication with the memory, wherein the memory stores instructions executable by the processor, and the instructions are stored in a module for establishing video channel list, a video channel selecting module, a pagination module, and a playing module, wherein
    the module for establishing video channel list is to establish a video channel list;
    the video channel selecting module is to select at least one video channel from the video channel list;
    the pagination module is to determine a pagination number of a display screen, based on number of video channel selected and split-screen number of the display screen; and
    the playing module is to play the selected video channels on each split-screen of a respective pagination in sequence, based on sequence of the selected video channels in the video channel list;
    wherein determining the pagination number of the display screen based on the number of the selected video channels and the split-screen number of the display screen is implemented by using the following formula, $p = n/s + (n \% s > 0)$, n is the number of the video channels, s is the split-screen number, p is the pagination number, (n % s>0) denotes that, when a remainder obtained after dividing n by s is greater than 0, (n % s>0)=1; otherwise, (n % s>0)=0.

\* \* \* \* \*